(12) United States Patent
Bartsch et al.

(10) Patent No.: US 7,624,909 B2
(45) Date of Patent: Dec. 1, 2009

(54) WELDED COMPONENT

(75) Inventors: Herbert Bartsch, Dogern (DE); Richard Brendon Scarlin, Oberflachs (CH)

(73) Assignee: Alstom Technology Ltd, Baden (CH)

( * ) Notice: Subject to any disclaimer, the term of this patent is extended or adjusted under 35 U.S.C. 154(b) by 45 days.

(21) Appl. No.: 11/984,660

(22) Filed: Nov. 20, 2007

(65) Prior Publication Data

US 2008/0067220 A1    Mar. 20, 2008

Related U.S. Application Data

(62) Division of application No. 11/127,108, filed on May 12, 2005, now Pat. No. 7,314,670.

(30) Foreign Application Priority Data

May 15, 2004    (DE) .................... 10 2004 024 299

(51) Int. Cl.
*B23K 35/24* (2006.01)

(52) U.S. Cl. .................. 228/225; 228/226; 228/227; 228/231

(58) Field of Classification Search .......... 228/226, 228/231, 101; 428/683
See application file for complete search history.

(56) References Cited

U.S. PATENT DOCUMENTS

| | | | |
|---|---|---|---|
| 4,010,965 A * | 3/1977 | Izuma et al. ................ 428/651 |
| 4,333,670 A | 6/1982 | Holko |
| 4,504,554 A | 3/1985 | Yoshioka et al. |
| 4,612,259 A * | 9/1986 | Ueda .......................... 428/661 |
| 4,817,859 A * | 4/1989 | Breitenmoser et al. ...... 228/226 |
| 4,958,431 A * | 9/1990 | Clark et al. ................. 29/889.1 |
| 4,962,586 A * | 10/1990 | Clark et al. ................. 29/889.2 |
| 5,024,582 A | 6/1991 | Bellows et al. |
| 5,746,579 A * | 5/1998 | Amos et al. ............. 416/204 A |
| 5,823,745 A * | 10/1998 | Anderson et al. ....... 416/213 R |
| 6,499,946 B1 | 12/2002 | Yamada et al. |

FOREIGN PATENT DOCUMENTS

| | | |
|---|---|---|
| DE | 100 45 031 A1 | 4/2001 |
| DE | 101 12 062 A1 | 9/2002 |
| DE | 693 31 691 T2 | 10/2002 |
| DE | 699 07 982 T2 | 2/2004 |

* cited by examiner

*Primary Examiner*—Kiley Stoner
(74) *Attorney, Agent, or Firm*—Buchanan Ingersoll & Rooney PC

(57) ABSTRACT

A welded component includes at least one high temperature segment of a high alloy Cr steel with high creep strength and a low temperature segment of a low alloy steel with high toughness and/or a high yield strength which are connected materially to one another via a weld joint. In one such component a gradual transition of chemical, physical and mechanical properties in the joining area is achieved in that between the weld joint and the high temperature segment there are at least two successive clad layers of at least two lower alloy weld metals with a total content of elements which increase the creep strength, such as for example Cr, Mo, W and V, which total content decreases toward the weld joint, and/or an increasing total content of elements which increase the toughness and/or yield strength, such as for example Ni and Mn, which total content increases toward the weld joint.

4 Claims, 5 Drawing Sheets

WELDED COMPONENT

This application is a Divisional of Ser. No. 11/127,108, filed on May 12, 2005, now U.S. Pat. No. 7,314,670.

TECHNICAL DOMAIN

This invention relates to the area of turbomachinery. For example, it relates to a welded component and a process for producing such a component.

PRIOR ART

Rotors of turbomachinery, for example of steam or gas turbines, generally have a high temperature segment and a low temperature segment which are exposed to high and low temperatures respectively (from steam or hot gas) during operation. In the high temperature segment a high creep strength is necessary which can be best achieved by high alloy steels with a high proportion of Cr. Other alloying elements such as for example Mo, W and V additionally increase the creep strength. In the low temperature segment conversely a high yield strength and toughness are necessary; they can be best achieved with a low alloy steel with a proportion of Ni of 3.5%, for example.

The best approach in this respect is a welded rotor. The different steels of the segments can be directly welded to one another along the rotor axis when a weld metal of a composition between the two steels is used (see in this respect U.S. Pat. No. 6,499,946) and if the welded rotor is subjected to following heat treatment (post weld heat treatment, abbreviated PWHT) before it is started up. But this approach has two disadvantages:

Transversely to the weld joint there is an abrupt change in the chemical, physical and mechanical properties; this leads to nonuniform loading and reduced service life of the component.

The temperature for post weld heat treatment PWHT is a compromise between the ideal temperatures for the two steels, i.e. it is too high for the low allow steel (softening) and too low for the high alloy steel (low toughness and high residual welding stresses).

Alternatively to the above described approach, the high alloy steel can first be provided with a weld layer of a steel with a somewhat lower proportion of Cr and a lower creep strength and then can be subjected to heat treatment PWHT typically at a temperature which is roughly 20° C. below the tempering temperature of the base material of the high temperature segment, i.e. at the temperature at which the residual welding stresses are largely reduced without a noteworthy decrease of strength values. Then it is welded by means of a weld metal of somewhat lower creep strength (and lower Cr content) to the low alloy segment. Finally, the welded component is subjected to heat treatment PWHT at a temperature which is suitable for a low alloy steel (U.S. Pat. No. 4-4,962, 586), i.e. in turn roughly 20° C. below the tempering temperature of the base material of the low temperature segment. The disadvantage of this approach is that as before there is an abrupt, step-by-step transition in the chemical, physical and mechanical properties.

DESCRIPTION OF THE INVENTION

Therefore the object of the invention is to form a welded component of the initially mentioned type which is characterized by a gradual transition in the chemical, physical and mechanical properties from one segment to another segment, and to devise a process for its production.

The object is achieved by a welded component formed according to the present invention. The heart of the invention is to provide, between the weld joint and the high temperature segment, at least two successively clad layers of at least two lower alloy weld metal deposits with a total content of elements which impart high creep strength to the steel, such as for example Cr, Mo, W, and V, which total content decreases toward the weld joint, and/or an increasing total content of elements which increase the toughness and/or yield strength, such as for example Ni or Mn. In this way the desired gradual transition between the welded segments in chemical, physical and mechanical properties is easily achieved.

In order to achieve a uniform structure of the clad layers even for greater layer thicknesses, it is advantageous if the clad layers each consist of several successively applied welding beads with low thickness. According to one preferred development the clad layers each have a thickness of several millimeters, especially 8 to 15 mm, especially preferably roughly 10 mm.

It has proven especially suitable in practice for rotors that the high temperature segment consists of a 8.5 to 13% Cr steel, that the first clad layer consists of a 4 to 6% CrMo steel and the second clad layer consists of 1.8 to 2.5% CrMo steel, that the low temperature segment consists of a 0.8 to 3.7% Ni, 0.8 to 2.5% Cr steel, and that the weld joint is built up with a weld metal of 0.8 to 2.7% Ni, 0.5 to 1.3% Cr steel. The weld joint has a thickness of several millimeters, especially up to 30 mm.

One preferred configuration of the process as claimed in the invention is characterized in that to apply the clad layers in succession individual weld beads of low thickness are applied.

If the high temperature segment consists of 8.5 to 13% Cr steel, to produce the first clad layer preferably weld beads of 4 to 6% CrMo steel and to produce the second clad layer weld beads of a 1.8 to 2.5% CrMo steel are applied, and in the second step the high temperature segment with the clad layers is stress-relieved for 10 hours at 670±10° C.

If the low temperature segment consists of a 0.8 to 3.7% Ni, 0.8 to 2.5 Cr steel, the weld joint is produced preferably using a weld metal of 0.8 to 2.7% Ni, 0.5 to 1.3% Cr steel, and the component is stress-relieved in the fourth step for 10 hours at 590±10° C.

BRIEF EXPLANATION OF FIGURES

The invention will be explained below using embodiments in conjunction with the drawings.

EMBODIMENTS OF THE INVENTION

Figure 1:
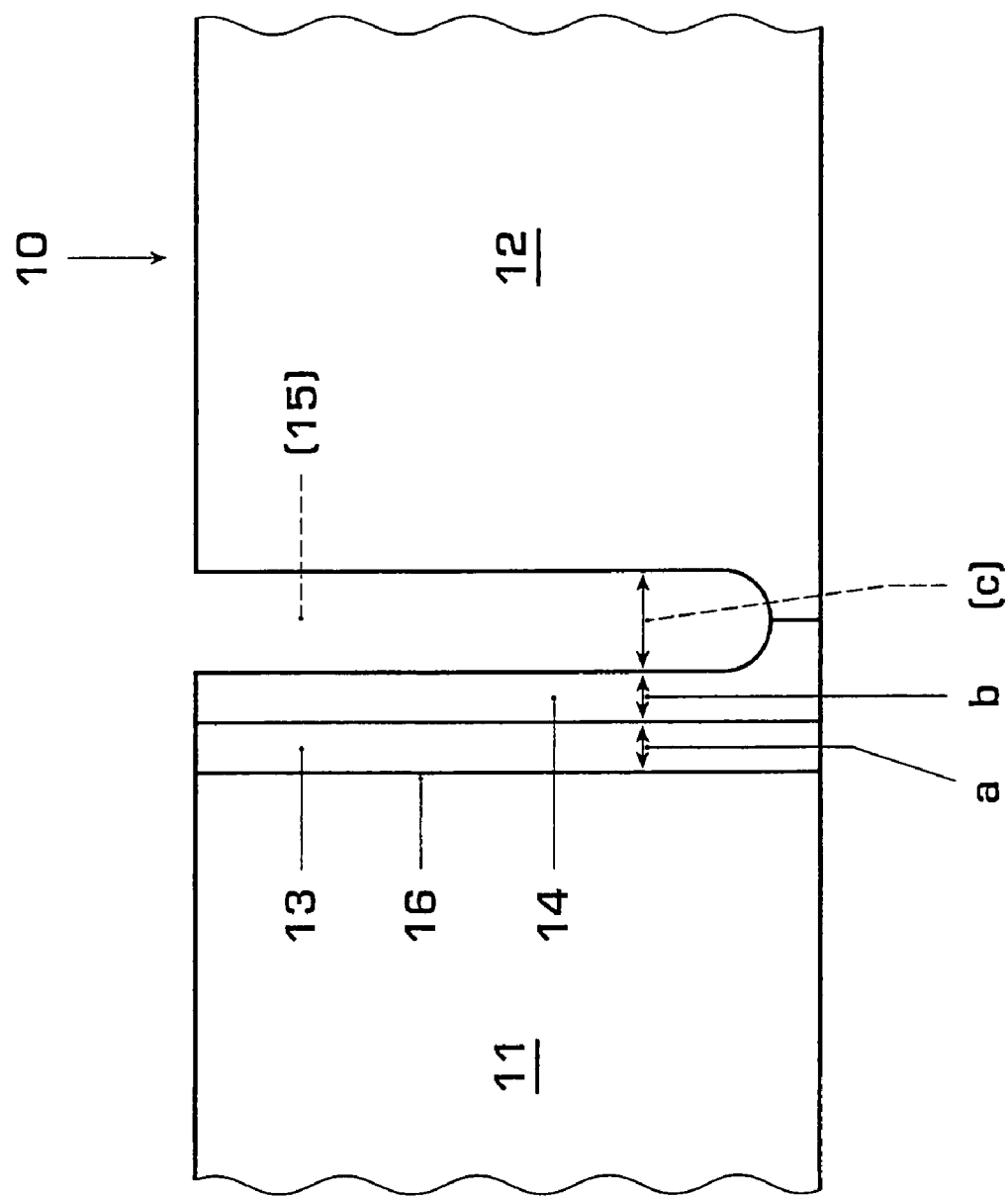
FIG. 1 shows in a schematic a section through the weld preparation of the high temperature segment for the junction weld to the low temperature segment according to one preferred embodiment of the invention.
Figure 5:
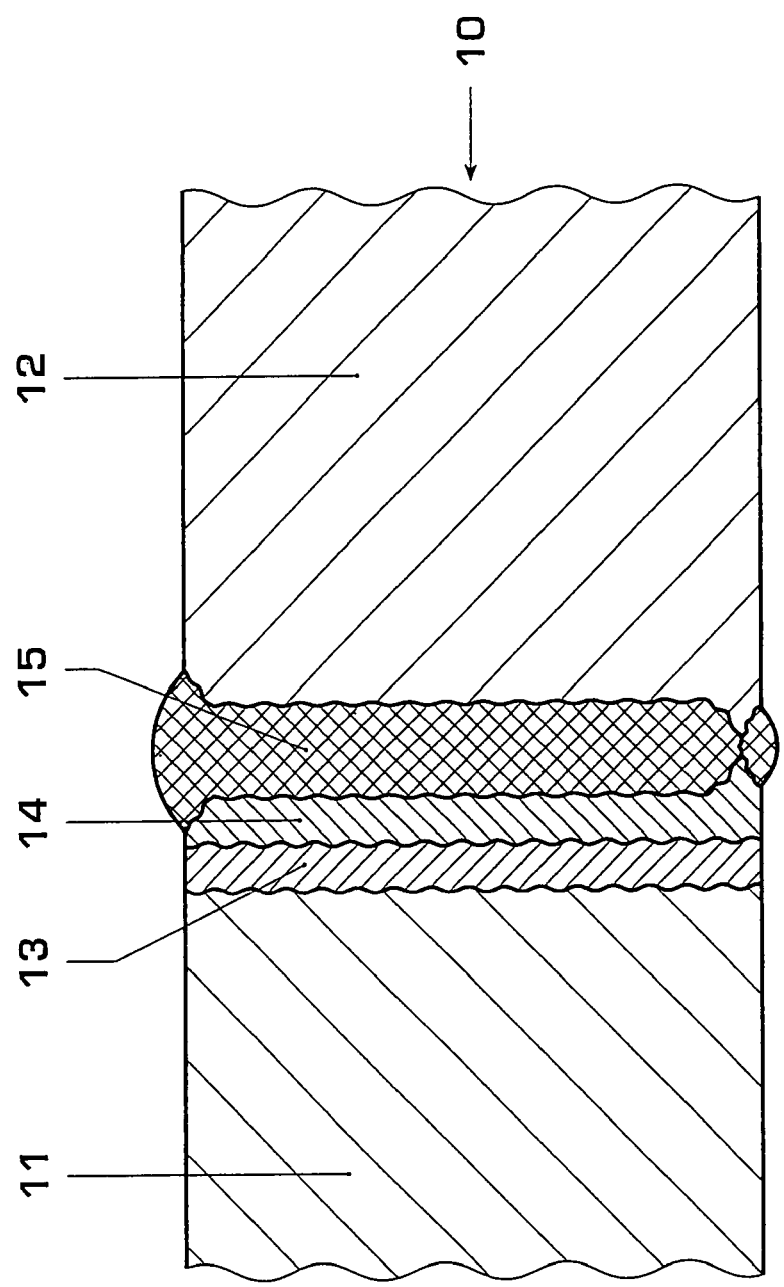
FIG. 5 shows the macrosection through a weld joint which has been implemented as shown in FIG. 1.

FIG. 1 shows in a schematic a section through the weld preparation of the high temperature segment for the junction weld to the low temperature segment according to one preferred embodiment of the invention. FIG. 5 shows a macrosection through the weld joint which has been implemented as shown in FIG. 1. The two figures should be examined at the same time.

The component 10, for example the rotor of a steam turbine or gas turbine, of which FIGS. 1 and 5 show only a small extract, comprises a high temperature segment 11 and a low temperature segment 12 which consist of different steels which are adapted to the respective temperature of use. As shown in FIG. 5, they are joined to another materially along the direction of the rotor axis via a weld joint 15. FIG. 1 shows the state immediately before the junction welding of the two segments 11, 12. The point at which the weld 15 with a thickness c is located is identified with a broken reference line and positions 15 and c are placed in parentheses.

Between the weld joint 15 and the joining surface 16 of the high temperature segment 11 there are two clad layers 13 and 14 directly in succession; they cause a gradual transition between the two segments 11 and 12 in chemical, physical and mechanical properties. This is achieved by a matched choice of materials for the clad layers 13, 14 and the weld joint 15 for which likewise alloy steels are used.

For a component 10 in the form of a rotor for a turbomachine, in practice the following alloy steels for segments 11, 12 and the layers 13, 14, and 15 have proven themselves (proportions of the alloying elements in % by weight).

|    | 11    | 13      | 14      | 15    | 12    |
|----|-------|---------|---------|-------|-------|
| C  | 0.12  | 0.09    | 0.08    | 0.06  | 0.21  |
| Si | 0.10  | 0.27    | 0.2     | 0.15  | 0.05  |
| Mn | 0.45  | 0.88    | 0.8     | 1.2   | 0.20  |
| Cr | 10.4  | 6.5 *)  | 3.4 *)  | 0.76  | 2.27  |
| Ni | 0.74  | 0.67    | 0.25    | 2.0   | 2.18  |
| Mo | 1.06  | 0.80    | 0.8     | 0.52  | 0.73  |
| P  | 0.008 | 0.006   | 0.013   | 0.018 | 0.004 |
| S  | 0.002 | 0.001   | 0.006   | 0.007 | 0.003 |
| W  | 0.81  | —       | —       | —     | —     |
| V  | 0.18  | 0.33    | —       | —     | 0.07  |

*) for the clad layers 13 and 14 a 5% CrMo steel or a 2.25% CrMo steel is used; the locally measured Cr proportions in the examined weld beads result from dilution with the preceding bead.

With the material compositions cited in the table above, a weld joint between the high temperature segment 11 (of 10% Cr steel) and a low temperature segment 12 is produced; FIG. 5 shows a photomicrograph.

In the production of the weld joint, first the two clad layers 13 and 14 are applied to the joining surface 16 of the high temperature segment 11 in succession by build-up welding. Each of the 10 mm thick clad layers 13, 14 was formed by successively applied weld beads (individual layers) of low thickness.

After applying the clad layers 13, 14 to the high temperature segment 11, the high temperature segment 11 with the clad layers 13, 14 was tempered (stress-relieved) at 670±10° C. for 10 hours. Afterwards the weld preparation (groove shape for the junction weld between the high temperature segment 11 and the low temperature segment 12) was produced by mechanical working. This state is shown in FIG. 1.

Then the high temperature segment 11 with the clad layers 13, 14 and the low temperature segment 12 are welded to one another with the formation of a 20 mm thick weld joint 15 (see FIG. 5), a 2.5 NiCrMo alloy having been used as the weld metal. After welding, the component 10 is tempered (stress-relieved) at 590±10° C. for 10 hours.

Figure 2:
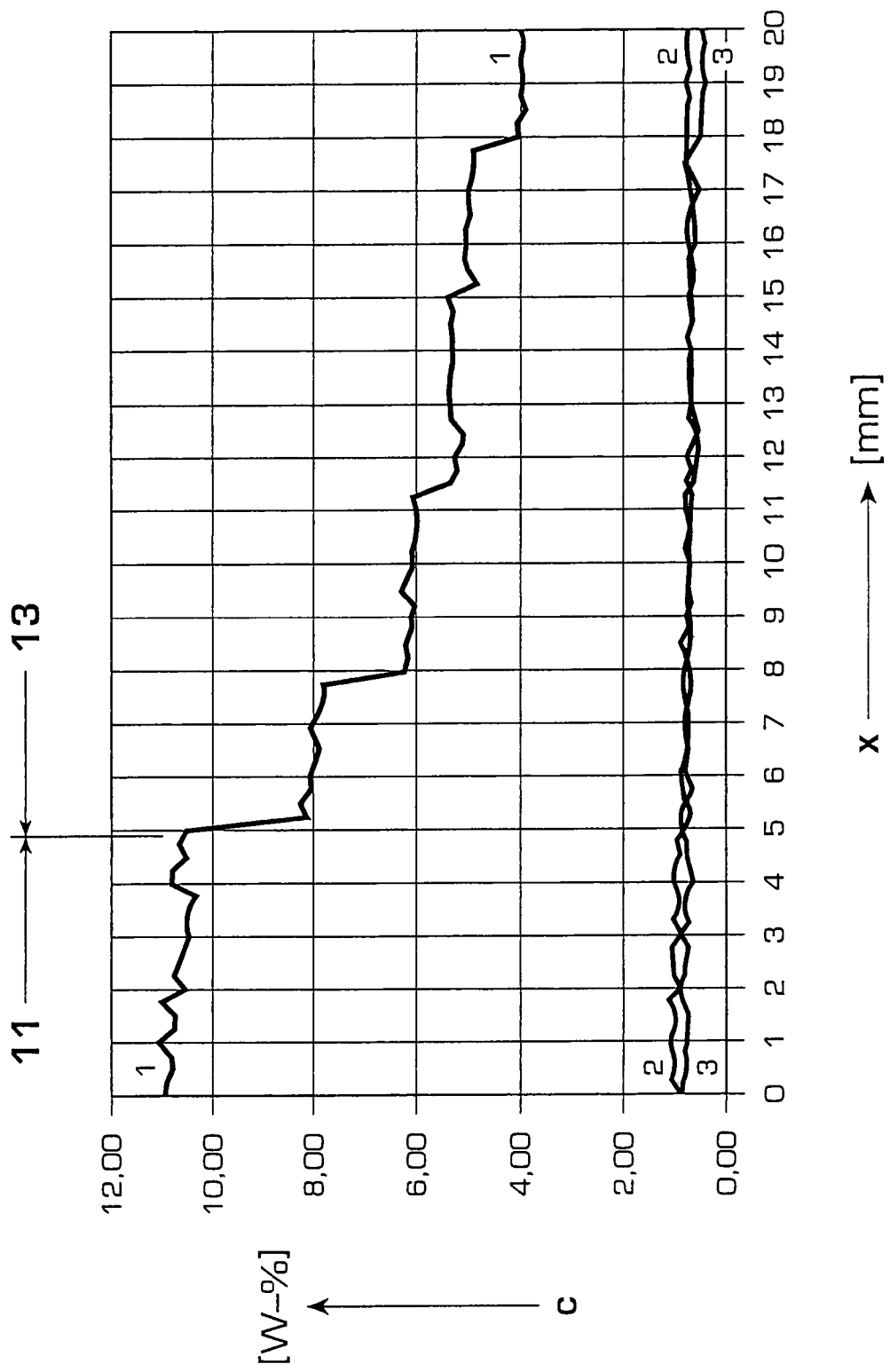
FIG. 2 shows the characteristic of the measured proportions of Cr, Mo, and Ni in the first component area of the weld joint which is comparable to FIG. 1, as shown in FIG. 5.
Figure 3:
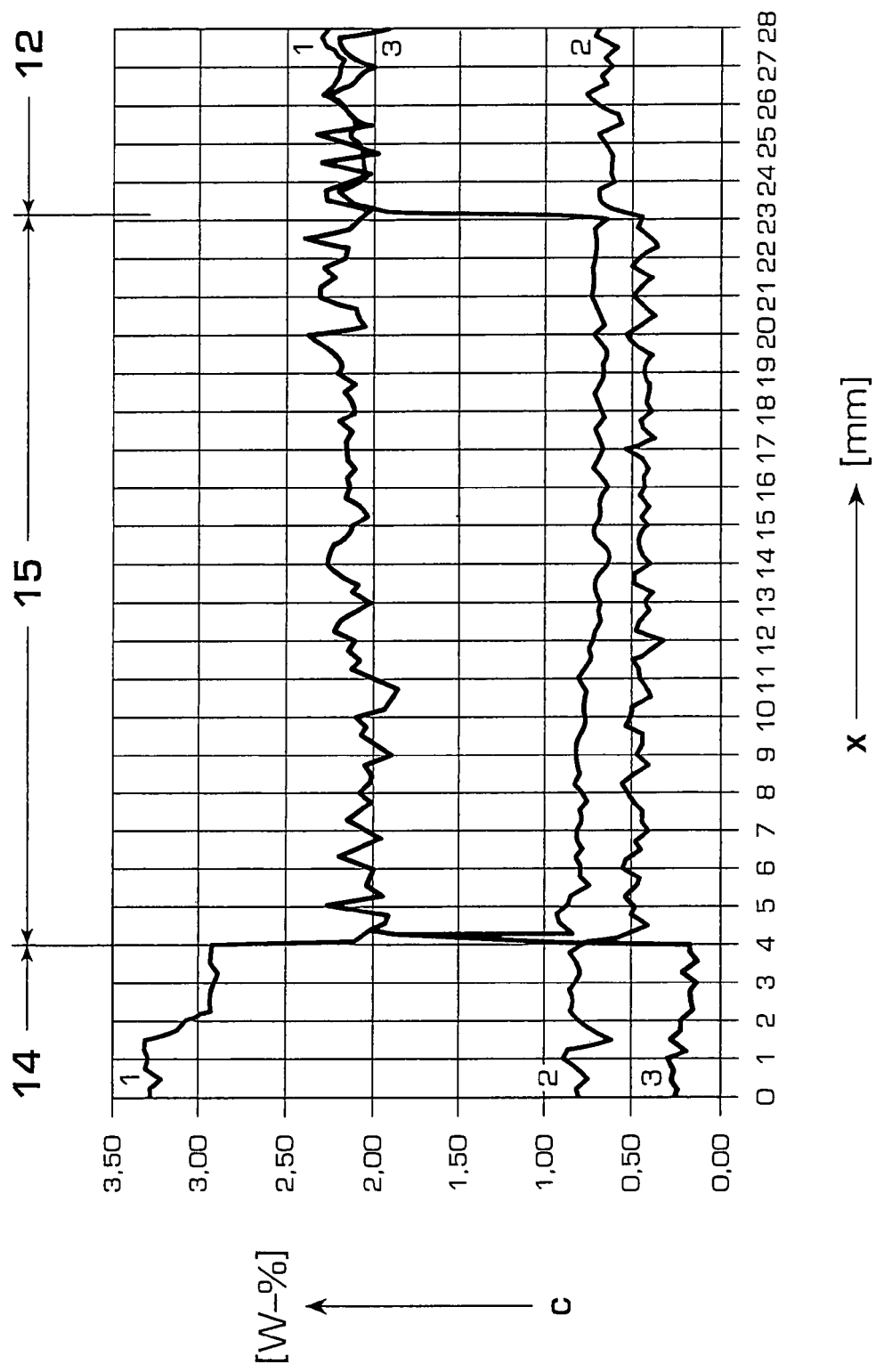
FIG. 3 shows the characteristic of the measured proportions of Cr, Mo, and Ni in the second component area of the weld joint which is comparable to FIG. 1, as shown in FIG. 5.

On the component 10 with the finished weld joint, the concentrations in % by weight of the elements Cr, Mo and Ni were measured transversely to the joining surface as a function of the local coordinate (x). The results are shown in FIGS. 2 and 3, the curve (1) showing the Cr proportion, curve (2) showing the Mo proportion and curve (3) showing the Ni proportion. It is apparent that with a simple 2-layer structure of clad layers a very uniform transition especially of the Cr concentration in the joining area can be achieved.

Figure 4:
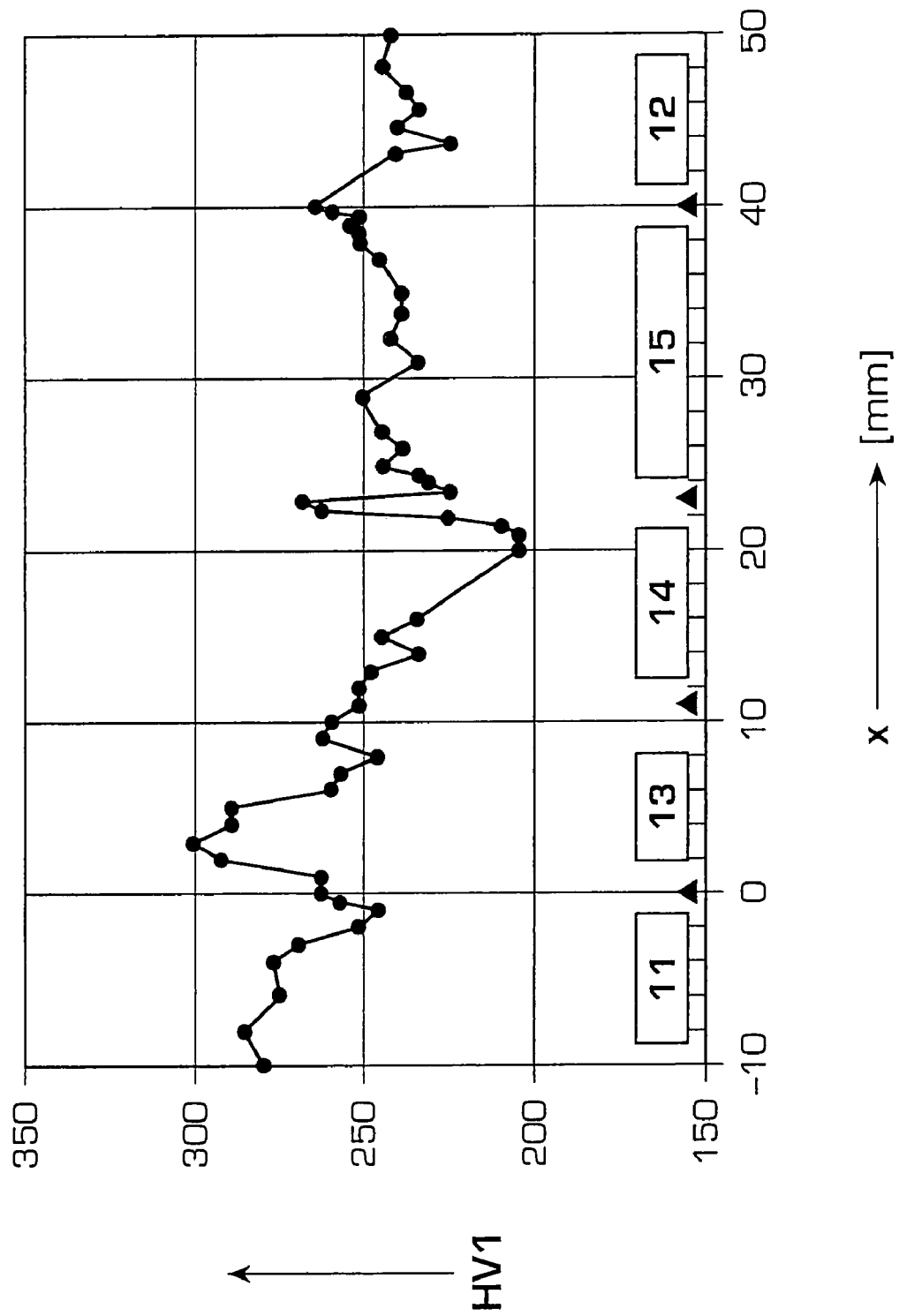
FIG. 4 shows the measured characteristic of the microhardness over the weld joint as shown in FIG. 5.

FIG. 4 plots the characteristic of the measured microhardness profile HV1 by way of the local coordinate x. The triangles shown in the diagram mark the melting lines between the individual layers and segments. Aside from a hardness minimum of 200 HV1 for the second clad layer 14 the hardness characteristic is very uniform.

Of course, the invention is not limited to the above described embodiment. Thus, for example, the thickness of the clad layers 13, 14 can each be in the range from roughly 8 to 15 mm and the composition of the materials for the clad layers 13, 14 and the segments 11, 12 can likewise fluctuate within certain limits. For the high temperature segment 11 a steel with 8.5 to 13% Cr, especially 10% Cr, can be used to advantage and for the low temperature segment 12 a steel with 0.8 to 3.7% Ni, preferably 3.5% Mo and 0.8 to 2.5% Cr can be used. The first clad layer 13 consists of a 4 to 6% CrMo steel, preferably 5% CrMo steel and the second clad layer 14 consists of a 1.8 to 2.5% CrMo steel, preferably 2% CrMo steel. For the weld connection 15 a 0.8 to 2.7% Ni, 0.5 to 1.3% Cr steel is advantageous.

Finally, it is shown by way of example how the analysis can be controlled by fusion of the individual layers in the build-up welding of the layers 13, 14. The proportion of the previous layer is labeled x1 and the proportion of the new layer is labeled x2, the following applying:

$$x1 = 1/3 \text{ to } 2/3$$

$$x2 = 1 - x1$$

5% Cr dilution:

For a base metal with 11% Cr the following applies to the individual layers:

$$x1 \cdot 11\% \text{ Cr} + x2 \cdot 5\% \text{ Cr, therefore}$$

1st layer: ½·11% Cr+½·5% Cr=8% Cr

2nd layer: ⅓×8% Cr+⅔·5% Cr=6% Cr

3rd layer: ⅓×6% Cr+⅔·5% Cr=5.3% Cr

4th layer: ⅓×5.3% Cr+⅔·5% Cr=5.1% Cr

Therefore 4 weld layers are necessary to move from the Cr content of the base metal (11%) to the roughly 5% Cr of the cladding.

2.25% Cr dilution:

1st layer: 0.6×5.1% Cr+0.4·2.25% Cr=4% Cr

2nd layer: 0.6×4% Cr+0.4·2.25% Cr=3.3% Cr

3rd layer: 0.6×3.3% Cr+0.4·2.25% Cr=2.9% Cr

REFERENCE NUMBER LIST 10 component (rotor)
11 high temperature segment
12 low temperature segment
13,14 clad layer
15 weld joint
16 joining surface (high temperature segment)
a,b,c thickness

The invention claimed is:

1. Process for producing a welded component, wherein proceeding from two separately present segments, the segments comprising a high temperature segment made of a first material and a low temperature segment made of a second material, in a first step, at least two clad layers are applied to a surface of the high temperature segment in succession by build-up welding, wherein in a second step the high temperature segment with the at least two clad layers is subjected to a heat treatment which is suitable for the first material of the high temperature segment, wherein in a third step the high temperature segment is welded to the low temperature segment by way of the at least two clad layers, and wherein in a fourth step the welded segments are subjected to heat treatment which is suitable for the second material of the low temperature segment at a lower temperature.

2. Process as claimed in claim 1, wherein to apply the clad layers individual weld beads of low thickness are applied in succession.

3. Process as claimed in claim 1, wherein the high temperature segment comprises a 8.5 to 13% Cr steel, wherein to produce the first clad layer weld beads of a 5 to 6% CrMo steel are applied and to produce the second clad layer weld beads of a 1.8 to 2.5% CrMo steel are applied, and wherein in the second step the high temperature segment with the clad layers is stress-relieved for 10 hours at 670±10° C.

4. Process as claimed in claim 3, wherein the low temperature segment comprises a 0.8 to 3.7% Ni, 0.8 to 2.5% Cr steel, wherein the weld joint is produced preferably using a weld metal of 0.8 to 2.7% Ni, 0.5 to 1.3% Cr steel, and wherein the component is stress-relieved in the fourth step for 10 hours at 590±10° C.

* * * * *